(12) United States Patent
Ahn

(10) Patent No.: US 6,988,707 B2
(45) Date of Patent: Jan. 24, 2006

(54) ANTI-LOCK BRAKE EQUIPMENT SOLENOID VALVE

(75) Inventor: Dong-Ho Ahn, Kyunggi-do (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 30 days.

(21) Appl. No.: 10/322,733

(22) Filed: Dec. 19, 2002

(65) Prior Publication Data

US 2003/0201417 A1    Oct. 30, 2003

(30) Foreign Application Priority Data

Apr. 24, 2002  (KR) .................. 10-2002-0022537

(51) Int. Cl.
*B60T 8/36* (2006.01)

(52) U.S. Cl. .................. 251/129.15; 251/129.02; 303/119.2

(58) Field of Classification Search .......... 251/129.15, 251/129.02; 303/119.1, 119.2; 137/454.2
See application file for complete search history.

(56) References Cited

U.S. PATENT DOCUMENTS

| 5,167,442 | A | * | 12/1992 | Alaze et al. ........... 251/129.02 |
| 5,439,279 | A | * | 8/1995 | Linkner, Jr. et al. .... 251/129.15 |
| 5,577,322 | A | * | 11/1996 | Ohshita et al. ........ 251/129.15 |
| 5,605,386 | A | * | 2/1997 | Ziegler et al. ........... 303/119.2 |
| 5,673,980 | A | * | 10/1997 | Schwarz et al. ......... 303/119.2 |
| 5,681,097 | A | * | 10/1997 | Tackett et al. ......... 251/129.15 |
| 5,879,060 | A | * | 3/1999 | Megerle et al. .......... 303/119.2 |
| 6,113,066 | A | * | 9/2000 | Hohl et al. ............. 251/129.15 |
| 6,189,985 | B1 | * | 2/2001 | Fritsch et al. ............ 303/119.2 |
| 6,247,766 | B1 | * | 6/2001 | Subramanian et al. ... 303/119.2 |
| 6,439,265 | B1 | * | 8/2002 | Gruschwitz et al. ... 251/129.15 |
| 6,471,305 | B1 | * | 10/2002 | Leventhal et al. ....... 303/119.2 |

FOREIGN PATENT DOCUMENTS

JP          2001055132 A   *   2/2001

* cited by examiner

*Primary Examiner*—Eric Keasel
(74) *Attorney, Agent, or Firm*—Greenblum & Bernstein, P.L.C.

(57) ABSTRACT

An oil pressure control valve for an Anti-Lock Braking System (ABS) includes a modulator block comprising at least an inlet port, a discharge port, and a receiving unit. The control valve also comprises an armature, a coil body, and a housing. The housing includes at least a coupling hole to receive a valve seat, which comprises at least a filter and a seal cup on its outer periphery. When the coil body is energized, a plunger performs a reciprocating motion in which a projection of the plunger moves into contact with and separates from an opening in the valve seat to adjust fluid flow to the discharge port. A region encompassing the discharge port includes at least the aperture and the projection.

17 Claims, 1 Drawing Sheet

[FIG. 1]
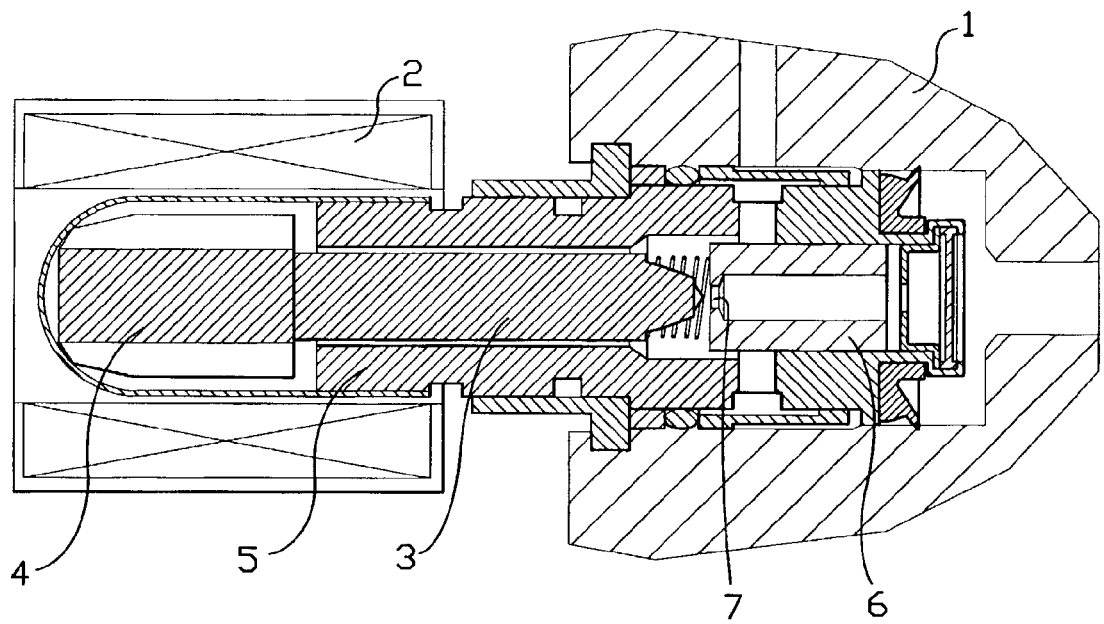
[FIG. 2]
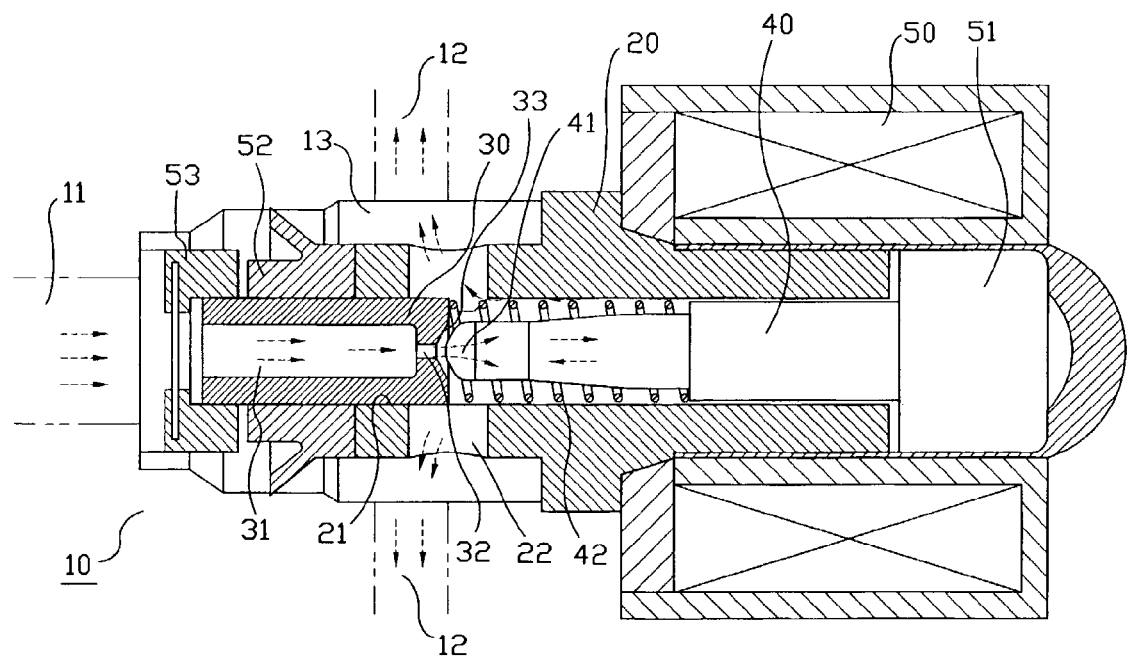

ANTI-LOCK BRAKE EQUIPMENT SOLENOID VALVE

BACKGROUND OF THE INVENTION

1. Field of the Invention

The present invention relates to an oil pressure control valve for an anti-lock brake, and more particularly to an oil pressure control valve for an anti-lock brake comprising a modulator block having an inlet port for receiving brake oil introduced from a master cylinder, and a discharge port for discharging brake oil to a wheel cylinder, wherein a receiving section is formed within the modulator block in a manner to communicate with the inlet and discharge ports, a housing and a coil body are mounted in the receiving section, and a plunger and a valve seat are coupled with the housing, and whereby when the coil body is energized, the plunger is moved forward via a magnetic field to close a valve port, and when the coil body is not energized, the plunger is moved backward due to an elasticity of a compressed spring to open the valve port, thereby adjusting brake oil flow.

2. Description of the Related Art

Generally, an anti-skid system for putting a brake on a vehicle having an ABS system is provided for preventing a lock of a cartwheel by adjusting oil pressures of respective wheel cylinders by ECU signals in an actuator, in such a manner that a control according to a road surface is performed by detecting a winding number of the cartwheel based on signals from a cartwheel speed sensor and representing the winding number as an output signal.

In the anti-skid system, brake oil is introduced from a master cylinder into a modulator block so that the velocity of a vehicle can be controlled via the adjustment of oil pressure. The anti-skid system will be described in reference to FIG. 1 as follows:

A solenoid valve is inserted into a modulator block 1, an armature 4 coupled with a plunger 3 is tightly contacted with a housing 5 at a lateral portion thereof via magnetic field when a coil 2 is energized, and the plunger 3 tightly contacts with a vent 7 of a valve scat 6 to close and/or open a valve port thereby adjusting brake oil.

SUMMARY OF THE INVENTION

A conventional solenoid valve as described above has problems in that a separate combination such as a bushing is required for coupling a housing with a modulator block. Accordingly, an O-ring is required and the outer surface of the housing must be processed for coupling the bushing to the O-ring.

In addition, there was problems that many parts are required for fabricating a product, a volume of the product becomes greater due to its complicated construction, and also because vents of a valve seat are spaced from a discharge port of the housing, brake oil does not flow rapidly and smoothly when putting a brake thereby deteriorating break power.

Therefore, the present invention has been made in view of the above problems, and it is an object of the present invention to provide an oil pressure control valve for an anti-lock brake, wherein a coupling hole is formed in the lateral side of a housing, a valve seat is installed in the coupling hole, a seal cup is coupled to the outer periphery of the valve seat, a filter is coupled between the seal cup and an inlet cup, a openable hole of the valve seat and a projection of a plunger are disposed in a discharge hole of the housing, thereby reducing the number of required parts, accordingly achieving a minimization and a lightweight, simplifying the construction of a valve housing, also simplifying an assembly process, and enhancing the competitiveness of a product as well as increasing a productivity due to the reduction of the required parts.

Another object of the present invention is to flow brake oil rapidly and smoothly when putting a break.

To achieve the above objects by a provision of an oil pressure control valve for an anti-lock brake for discharging brake oil introduced from a master cylinder to an inlet port through a discharge port to a wheel cylinder, the oil pressure control valve for an anti-lock brake comprising a modulator block 10; a receiving section formed within the modulator block 10 to communicate with the inlet and discharge ports 11 and 12; a housing 20 mounted on the receiving section, having a coupling hole 21; a coil body 50 which is coupled with the housing 20 at an outer portion thereof and formed within the modulator block 10; an armature 51 which is coupled with the coil body 50 and is formed coaxial with the housing 20; a plunger 40 which is coupled with the armature 51 and mounted within the housing 20, the plunger 40 having a projection 41 at an end thereof; a compressed spring 42 coupled to one lateral side of the projection 41 of the plunger 40; a valve seat 30 to which one end of the compressed spring 42 is supported, the valve seat 30 installed in the coupling hole 21 of the housing 20; a chamber 31 defined in the valve seat; and an openable hole 32 for communicating with the chamber 31 to adjust brake oil flow, wherein the openable hole 32 is tightly contacted to the projection 41 and has an openable construction, thereby allowing it to be attached/detached to/from the projection, and the openable hole 32 of the valve seat 30 and the projection 41 of the plunger 40 are positioned within the discharge hole 22 of the housing 20.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a cross sectional view of a conventional solenoid valve; and

FIG. 2 is a cross sectional view of an oil pressure control valve in an ABS system of the invention.

DETAILED DESCRIPTION OF THE PREFERRED EMBODIMENT

Hereinafter a construction of an oil pressure control valve for an ABS of the invention will be described in detail in reference to FIG. 2 showing a side sectional view thereof.

Oil from a master cylinder is introduced into an inlet port 11, and a modulator block 10 discharges oil into a wheel cylinder via an outlet port 12. The modulator block 10 has a receiving section 13 therein.

The receiving section 13 communicates with the inlet port 11 and the outlet port 12 of the modulator block 10.

Further, a housing 20 is mounted on the receiving section 13, and a coil body 50 is coupled with the housing 10 at an outer portion thereof within the modulator block 10.

An armature 51 is coupled within the coil body 50 and disposed coaxial with the housing 20.

The armature 51 has a magnetic body and thus can perform forward motion when the coil is energized.

A plunger 40 is coupled with the armature 51 within the housing 20.

The plunger 40 has a projection 41 at a distal end thereof.

A coupling hole 21 is provided in the housing 20 adjacent to the inlet port 11 to assist coupling of the valve seat 30.

The valve seat 30 defines a chamber 31 therein, and has an openable hole 32 communicating with the chamber 31.

An inclined plane 33 is connected with the openable hole 32 in such a manner that it is inclined from a lateral side of the valve seat 30.

The openable hole 32 is adapted to adjust oil which is introduced into the chamber 31, and attached/detached to/from the projection 41 of the plunger 40.

A compression spring 42 is mounted within the housing 20, with one end being supported to the valve seat 30 adjacent to the openable hole 32 and the other end being coupled with the projection 41 of the plunger 40.

The openable hole 32 of the valve seat 30 and the projection 41 of the plunger 40 are attached/detached to/from a portion within a discharge hole 22.

A seal cup 52 is coupled to an outer periphery of the valve seat 30 which is installed in the coupling hole 21 of the housing 20.

Further, a filter 53 is disposed between the seal cup 52 and the inlet port 11, and coupled with the outer periphery of the valve seat 30.

The operation of the oil pressure control valve for an ABS system of the invention having the above construction will be described as follows:

The valve seat 30 and the plunger 40 in the housing 10 are constantly opened by the compression spring 42.

Brake oil from the master cylinder is introduced into the filter 53 to remove foreign materials therefrom and then into the chamber 31 of the valve seat 30. Brake oil passes through the openable hole 32 of the valve seat 30, and flows into the wheel cylinder past the outlet port.

The inclined plane 33 provided in a side of the valve seat 30 and connected to the openable hole 32 functions as a guide for facilitating brake oil to flow into the discharge hole 22 of the housing past the openable hole 32 from the chamber 31, thereby potentially improving brake power.

Further, since the openable hole 32 of the valve seat 30 and the projection 41 of the plunger 40 are positioned within the discharge hole 22 of the housing 20, brake oil passing through the openable hole 32 and the inclined plane 33 is discharged via the discharge hole 22 without pneumatic resistance.

Further, where an ECU of the ABS system judges to regulate oil flow so that oil flow may not occur between the inlet port 11 and the discharge port 12 based upon signals from the wheel speed sensor and according to road conditions, the ABS system applies current into the coil body 50.

This creates magnetic force in the coil body 50, thereby transferring magnetic force to the armature 51 having the magnetic body.

The transfer of magnetic force to the armature 51 moves the plunger 40 having the projection 41 at the end so that the projection 41 closes the openable hole 32 of the valve seat 40.

This closes an oil channel between the inlet port 1 and the discharge port 12, thereby blocking the flow of brake oil.

It will be appreciated that the ECU energizes the coil body 50 to open/close the openable hole 32, which is opened due to elastic force of the compression spring 42, so that the flow of brake oil can be controlled between the inlet port 11 and the discharge port 12.

As set forth above, the oil pressure control valve for an ABS system of the invention has the following advantages:

First, since the openable hole and projection of the valve seat are positioned within the discharge hole of the housing, brake oil can efficiently flow.

Second, the filter and the seal cup are coupled to the outer periphery of the valve seat to simplify assembly as well as reduce parts so that the control valve are advantageously decreased in size and weight, thereby saving manufacturing cost.

Third, the valve seat is installed in the coupling hole of the housing, thereby reducing the size of a product.

Fourth, the inclined plane is formed along the peripheral surface to communicate with the openable hole of the valve seat and function as a guide which allows brake oil to rapidly and smoothly flow via the discharge hole of the housing, thereby improving brake power.

According to the oil pressure control valve for an ABS system of the invention as set forth above, the assembly process is simplified and the cost for material is saved, thereby improving the productivity of a product over other products in the art.

What is claimed is:

1. An oil pressure control valve for an anti-lock brake for discharging brake oil introduced from a master cylinder to an inlet port through a discharge port to a wheel cylinder, the oil pressure control valve for an anti-lock brake comprising:
   a modulator block;
   a receiver formed within the modulator block to communicate with inlet and discharge ports;
   a housing mounted on the receiver and having a coupling hole;
   a coil body coupled to an outer portion of the housing;
   an armature provided within the coil body and being coaxial with the housing;
   a plunger coupled with the armature and mounted within the housing, the plunger having a projection at an end thereof;
   a compression spring positioned at one lateral side of the projection of the plunger;
   a valve seat to which one end of the compressed spring is supported, the valve seat positioned within the coupling hole of the housing;
   a chamber positioned in the valve seat;
   an openable hole that communicates with the chamber to adjust fluid flow, wherein the opening is configured to be closed when the projection is in contact with the opening and to be opened when the projection is spaced from the opening, wherein the opening of the valve seat and the projection of the plunger are positioned within the discharge port of the housing; and
   a seal cup and a filter mounted to an outer periphery of the valve seat that extends beyond a termination of the housing, the filter being mounted about an end of the valve seat.

2. The oil pressure control valve for an anti-lock brake according to claim 1, wherein the opening is provided in a plane inclined along a peripheral plane of a lateral side of the valve seat.

3. The oil pressure control valve according to claim 1, wherein the filter and the seal cup are mounted such that the filter and the seal cup are in contact with the valve seat.

4. The oil pressure control valve according to claim 1, wherein the projection comprises an end portion of said plunger.

5. The oil pressure control valve according to claim 1, wherein the projection is integral with the plunger.

6. The oil pressure control valve control valve according to claim 1, wherein the projection comprises a tapered portion of the plunger.

7. A control valve for an anti-lock brake system, the control valve comprising:
- a valve seat;
- a housing including a coupling hole to receive the valve seat;
- a plunger having a projection at an end thereof;
- an opening in the valve seat, the opening being configured to be closed when the projection is in contact with the opening and to be opened when the projection is spaced from the opening;
- at least one spring positioned between the plunger and the valve seat, the at least one spring supporting a movement of the projection;
- a discharge port provided at a predetermined axial region of the housing, the projection and the opening being positioned within the axial region; and
- a seal cup and a filter mounted to an outer periphery of the valve seat extending beyond a termination of the housing, the filter being mounted about an end of the valve seat.

8. The control valve according to claim 7, further comprising a surface of the valve seat facing the projection of the plunger and being inclined to correspond to the projection of the plunger.

9. The control valve according to claim 7, further comprising:
- an inlet port; and
- a chamber provided in the valve seat, wherein the chamber communicates with
- the inlet port and the opening in the valve seat.

10. The control valve according to claim 7, wherein the at least one spring is positioned within the axial region.

11. The control valve according to claim 7, further comprising:
- an inlet port; wherein the filter is positioned between the inlet port and the seal cup.

12. The control valve according to claim 7, further comprising:
- an inlet port; and
- a receiver that communicates with the inlet port and the discharge port.

13. The control valve according to claim 7, further comprising:
- a compression spring coupled to the plunger to control a movement of the projection to and from the opening.

14. The control valve according to claim 7, wherein the projection comprises a tapered portion of the plunger.

15. The control valve according to claim 7, wherein the filter and the seal cup are mounted such that the filter and the seal cup are in contact with the valve seat.

16. The control valve according to claim 7, wherein the projection is integral with the plunger.

17. The control valve according to claim 7, wherein the projection comprises an end portion of said plunger.

* * * * *